United States Patent
Moon et al.

(10) Patent No.: US 8,758,096 B2
(45) Date of Patent: Jun. 24, 2014

(54) GLASS SETTING PLATE FOR GLASS POLISHING SYSTEM

(75) Inventors: Won-Jae Moon, Seoul (KR); Sang-Oeb Na, Seoul (KR); Hyung-Young Oh, Goyang-si (KR)

(73) Assignee: LG Chem, Ltd., Seoul (KR)

( * ) Notice: Subject to any disclaimer, the term of this patent is extended or adjusted under 35 U.S.C. 154(b) by 930 days.

(21) Appl. No.: 12/900,106

(22) Filed: Oct. 7, 2010

(65) Prior Publication Data

US 2011/0086584 A1 Apr. 14, 2011

(30) Foreign Application Priority Data

Oct. 8, 2009 (KR) .................. 10-2009-0095704

(51) Int. Cl.
*B24B 41/06* (2012.01)
*B24B 7/07* (2006.01)

(52) U.S. Cl.
USPC .................. 451/390; 451/412; 428/323

(58) Field of Classification Search
USPC .......... 451/364, 390, 411, 412; 264/109, 122; 428/323
See application file for complete search history.

(56) References Cited

U.S. PATENT DOCUMENTS

| | | | |
|---|---|---|---|
| 3,240,850 A * | 3/1966 | Hess | 264/125 |
| 3,703,433 A | 11/1972 | Sargent | |
| 4,159,301 A * | 6/1979 | Buser et al. | 264/331.15 |
| 4,909,974 A * | 3/1990 | Toncelli | 264/71 |
| 5,321,055 A * | 6/1994 | Slocum | 523/171 |
| 6,205,728 B1 * | 3/2001 | Sutelan | 52/309.7 |
| 6,309,562 B1 * | 10/2001 | Sakai et al. | 252/301.36 |
| 6,627,315 B2 * | 9/2003 | Sakai | 428/406 |
| 6,886,304 B1 * | 5/2005 | Godi et al. | 52/612 |

FOREIGN PATENT DOCUMENTS

| | | |
|---|---|---|
| CN | 1452535 | 10/2003 |
| JP | 2000135671 | 5/2000 |
| JP | 200474399 A | 3/2004 |
| JP | 2005177961 A | 7/2005 |
| KR | 100818456 B1 | 3/2008 |
| WO | 9529039 A1 | 11/1995 |
| WO | WO 01/83166 | 11/2001 |

OTHER PUBLICATIONS

"New Practical Encyclopedia of Concrete", published on Mar. 2005 (Chapter 6 "Polymer Concrete, p. 939, 941, 945-951 and 953 and translation thereof".

* cited by examiner

*Primary Examiner* — Timothy V Eley
(74) *Attorney, Agent, or Firm* — Mckenna Long & Aldridge LLP

(57) ABSTRACT

A glass setting plate for a glass polishing system supports a lower surface of a glass in a glass polishing system for polishing a glass used for liquid crystal displays. The glass setting plate is made of a composite material obtained by molding and curing a mixture of granite particles and thermosetting resin.

7 Claims, 3 Drawing Sheets

GLASS SETTING PLATE FOR GLASS POLISHING SYSTEM

CROSS-REFERENCE TO RELATED APPLICATION

This application claims priority under 35 USC 119(a) to Korean Patent Application No. 10-2009-0095704 filed in Republic of Korea on Oct. 8, 2009, the entire contents of which are incorporated herein by reference.

BACKGROUND OF THE INVENTION

1. Field of the Invention

The present invention relates to a glass setting plate for a glass polishing system, and more particularly to a glass setting plate that supports a lower surface of a glass in a glass polishing system for polishing a glass used for liquid crystal displays.

2. Description of the Related Art

Generally, it is very important that a glass (or, a glass pane) applied to a liquid crystal display keeps its flatness to a certain level so as to accurately realize images of the liquid crystal display. Thus, fine waviness or unevenness existing on a surface of a float glass formed in a float manner should be removed.

Such a glass polishing process may be classified into so-called 'Oscar' type polishing in which glasses are individually polished one by one, and so-called 'inline' type polishing in which a series of glasses are successively polished. Also, the glass polishing process may be classified into 'single side polishing' in which only one surface of a glass is polished, and 'double side polishing' in which both surfaces of a glass are polished.

In a conventional glass polishing device, while a polishing plate (or, an upper plate) having a polishing pad installed thereto is moved in a horizontal direction and a polishing stage (or, a lower plate or a glass setting plate) having a glass located thereon is rotated, the glass is polished using a polishing slurry freely falling down onto the polishing plate.

However, as a glass to be polished becomes bigger to cope with the tendency that liquid crystal devices are larger, the upper plate serving as a polishing plate and the glass setting plate serving as a polishing stage naturally become bigger. Here, the glass setting plate should have sufficient flatness in order to ensure flatness of a glass pane completely polished. Also, it is important that the glass setting plate has a sufficient rigidity against deformation so as not to cause permanent deformation. In order to meet such requirements, it is urgently demanded to develop a glass setting plate using light and rigid materials.

A conventional glass setting plate for polishing so-called $8^{th}$ generation glass panes still has a burden on weight (for example, about 10 tons) though it can ensure good rigidity against deformation, because the conventional glass setting plate is generally made of carbon steel.

SUMMARY OF THE INVENTION

The present invention is designed to solve the problems of the prior art, and therefore the present invention is directed to providing a glass setting plate for a glass polishing system, which has the same size as conventional glass setting plates but has greatly reduced weight and improved strength.

In one aspect of the present invention, there is provided a glass setting plate for a glass polishing system, wherein the glass setting plate is made of a composite material obtained by molding and curing a mixture of granite particles and thermosetting resin.

Preferably, the granite particles and the thermosetting resin are mixed at a ratio of about 8.5:1.5 to about 9.5:0.5.

Preferably, the composite material is cured at a temperature of about 70° C. or above.

Preferably, after being molded, the composite material is surface-treated by means of grinding, lapping or polishing.

Preferably, the glass setting plate substantially has a rectangular parallelepiped shape.

Preferably, the glass setting plate is 2,550 mm in length, 2,250 mm in width, and 100 mm in height.

Preferably, the glass setting plate further includes a reinforcing member disposed therein.

Preferably, the reinforcing member has a plurality of plates perpendicularly coupled with each other to form a lattice structure that is substantially arranged in parallel with a plane of the composite material.

Preferably, the reinforcing member includes a plurality of first plates which are about 2,350 mm in length and about 50 mm in height, each first plate having a plurality of first slits along a length thereof; and a plurality of second plates which are about 2,050 mm in length and about 50 mm in height, each second plate having a plurality of second slits along a length thereof, wherein the first plates and the second plates are coupled with each other by mutual fitting of the first and second slits.

Preferably, the reinforcing member has a plurality of through holes formed in sidewalls of the lattice structure to increase a coupling force of the mixture.

The glass setting plate for a glass polishing system according to the present invention gives the following effects.

First, considering the tendency that the glass pane becomes larger, the glass setting plate may be enlarged by configuring the glass setting plate with a composite material in which granite particles and thermosetting resin are mixed.

Second, in comparison to conventional glass setting plates (for example, 10 tons) made of steel, the glass setting plate of the present invention has a decreased weight while keeping its mechanical strength.

Third, since the glass setting plate of the present invention has a low thermal expansion coefficient, deformation of the glass setting plate is less caused by the heat generated in the polishing process.

Fourth, conventional glass setting plates were weak against bending in spite of high strength and thus they could not meet yield strength, which is one of the most essential features of glass setting plates, but the glass setting plate of the present invention may enhance yield strength.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, a glass setting plate for a glass polishing system according to a preferred embodiment of the present invention will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
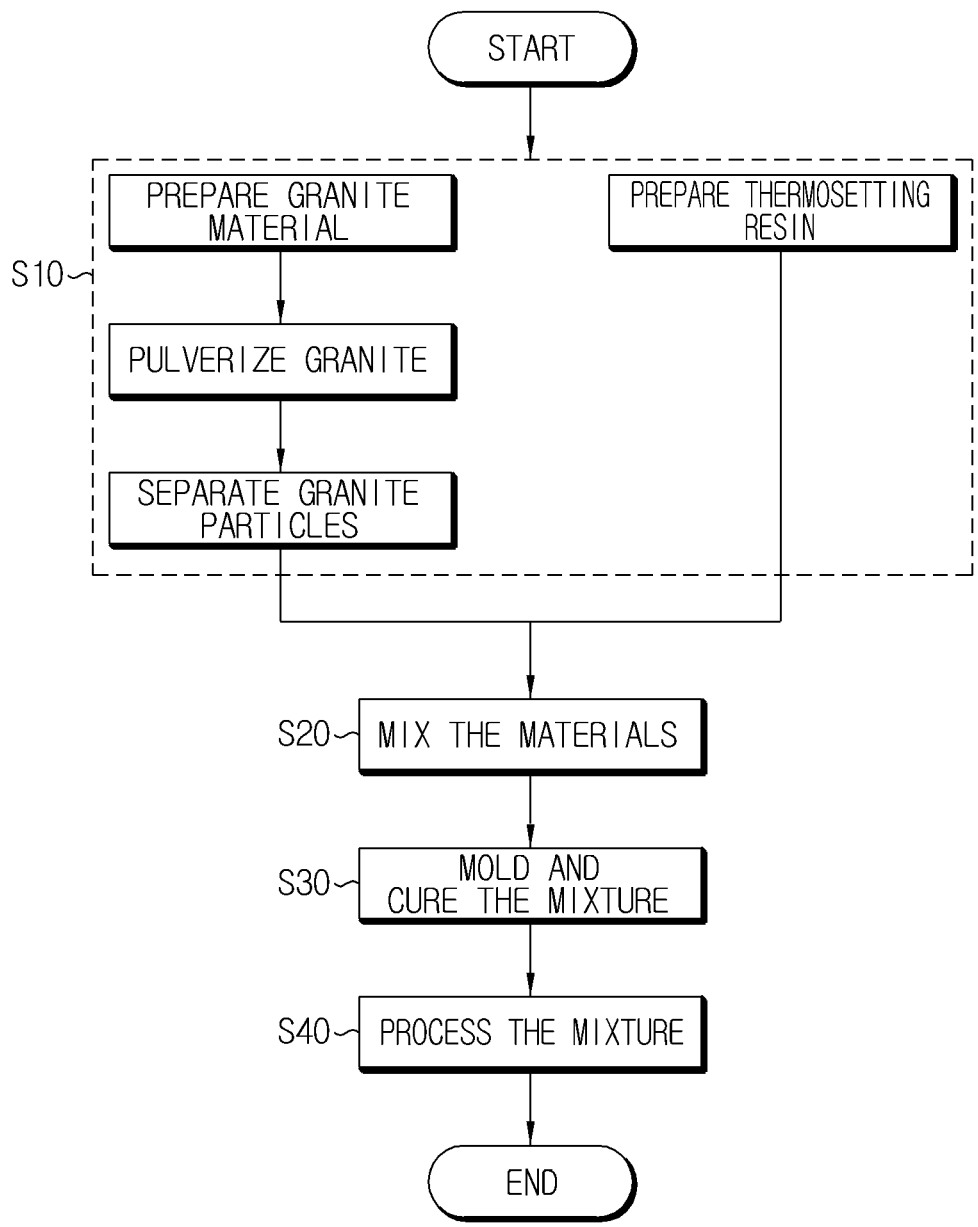
FIG. 1 is a flowchart schematically illustrating a process of manufacturing a glass setting plate for a glass polishing system according to a preferred embodiment of the present invention.
Figure 2:
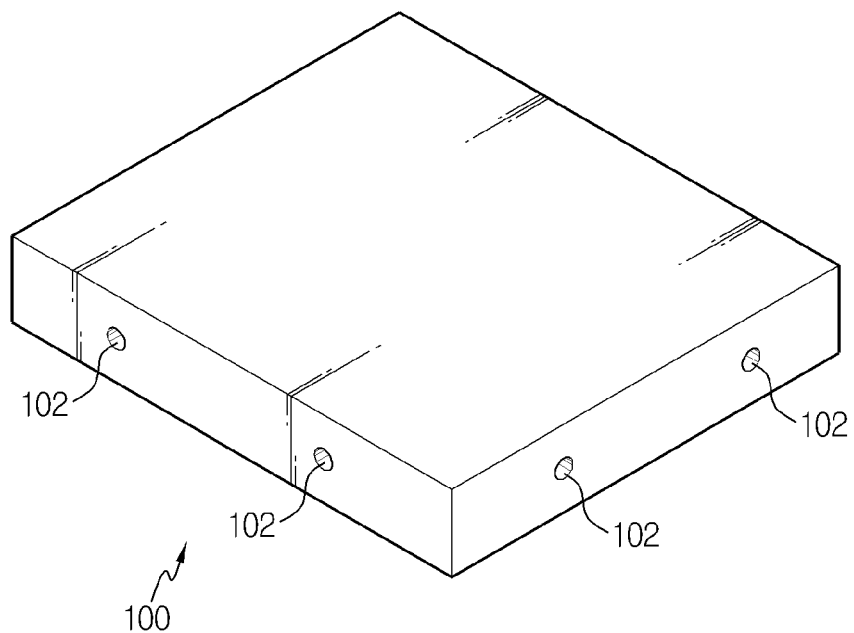
FIG. 2 is a perspective view schematically showing the glass setting plate for a glass polishing system according to the preferred embodiment of the present invention.
Figure 3:
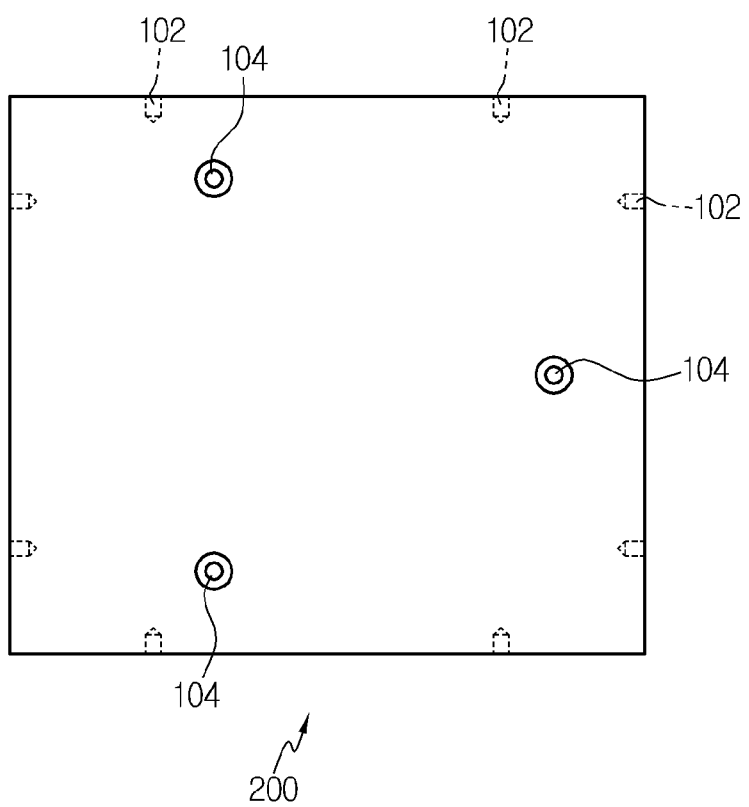
FIG. 3 is a bottom view of FIG. 2.

FIG. 1 is a flowchart schematically illustrating a process of manufacturing a glass setting plate for a glass polishing system according to a preferred embodiment of the present invention, FIG. 2 is a perspective view schematically showing the glass setting plate for a glass polishing system according to the preferred embodiment of the present invention, and FIG. 3 is a bottom view of FIG. 2.

A process for manufacturing the glass setting plate according to the preferred embodiment of the present invention is explained with reference to FIGS. 1 to 3.

First, granite particles and thermosetting resin are prepared (S10). Granite particles are obtained by pulverizing granite with a pulverizer (not shown) well known in the art and then separating particles with a separator (not shown). Granite particles pulverized by a pulverizer may be separated into 6 kinds of particles, among which particles necessary for a molding process (for example, about 1 μm or less, about 1 μm to 10 μm, about 10 μm to 100 μm, about 100 μm to 1,000 μm, about 1 mm to about 10 mm, and about 10 mm or more) are preferably used. For example, too small or big particles (for example, more than 10 mm) have disadvantages in molding, so such particles are removed in the separating process, and then granite particles with average particle sizes are prepared to enhance uniformity of molding.

Meanwhile, a thermosetting resin such as epoxy resin and phenol resin is prepared. Such a thermosetting resin of a polymer form is a kind of additive, and the thermosetting resin is used for dispersing granite particles as above or binding granite particles with each other.

Subsequently, the granite particles and the thermosetting resin are mixed in a chamber (not shown), sealed or preferably vacuumed, at a predetermined ratio to prepare a composite material (S20). Here, a mixing ratio of the granite particles and the thermosetting resin is about 8.5:1.5 to about 9.5:0.5, preferably 9:1. The chamber is made vacuous in the mixing process so as to prevent formation of fine pores in advance so that cracks are not generated in a finished glass setting plate 100.

Then, the mixture of the granite particles and the thermosetting resin is put into a mold (not shown) and then molded and cured at a normal temperature (S30). This molding and curing process is preferably executed using a reinforcing member 10 shown in FIG. 4, and the composite material is cured at about 70° C. or above for 72 hours on average.

Figure 4:
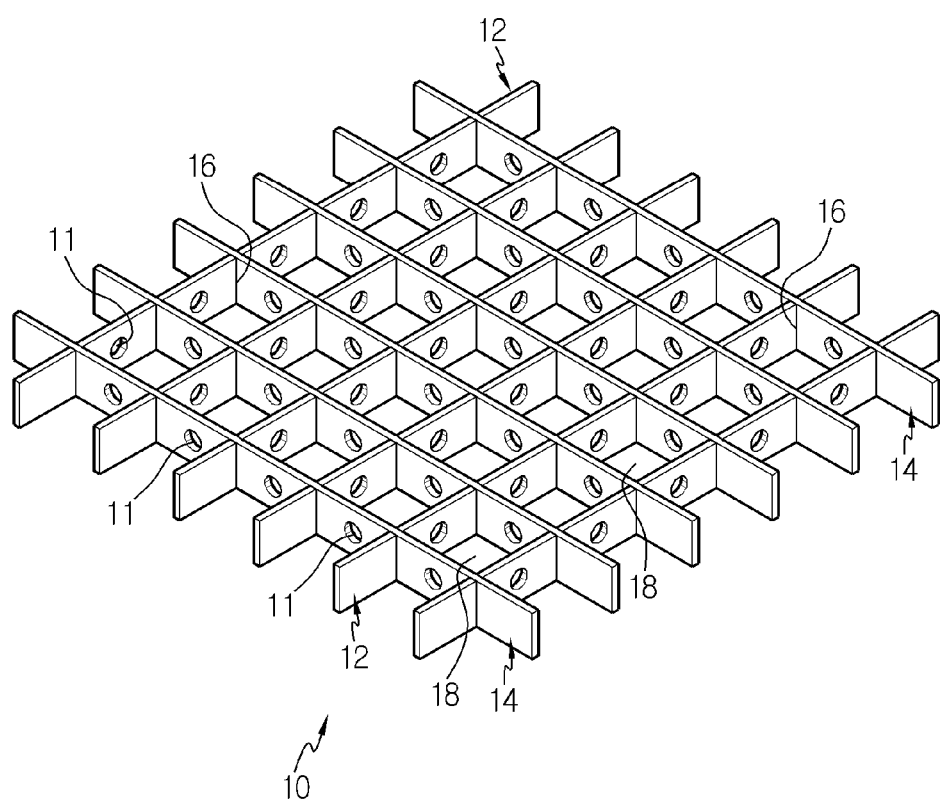
FIG. 4 is a perspective view schematically showing a reinforcing member disposed in the glass setting plate of FIG. 2.

Referring to FIG. 4, the reinforcing member 10 is used for preventing the glass setting plate 100 from being deformed due to external force or load applied thereto, and the reinforcing member 10 includes a plurality of plates perpendicularly coupled with each other to form a lattice structure. In the molding process, the reinforcing member 10 is arranged flat in the mold, preferably in parallel with a plane of the composite material. In more detail, the reinforcing member 10 includes a plurality of first plates 12 which are about 2,350 mm in length and about 50 mm in height, where each first plate has a plurality of first slits (not shown) along a length thereof, and a plurality of second plates 14 which are about 2,050 mm in length and about 50 mm in height, where each second plate has a plurality of second slits (not shown) along a length thereof. Here, the first plates 12 and the second plates 14 are coupled with each other by mutual fitting of the first and second slits, thereby forming a lattice structure. An adhesive or the like is applied to the fitting portions 16 of the first and second slits. As shown in FIG. 4, if the first plates 12 and the second plates 14 of the reinforcing member 10 are perpendicularly coupled with each other, rectangular empty cells 18 are respectively formed between them. Also, in order to increase a coupling force of the mixture of the composite material during the molding process, each cell 18 of the reinforcing member 10 has sidewalls in which through holes 11 are prepared. In other words, the through holes 11 allow the composite material to pass through or be located in the through holes 11, thereby enhancing a coupling force and a binding force between components of the composite material and between the composite material and the reinforcing member 10 during the molding and curing process.

Subsequently, a surface of the molded glass setting plate 100 is treated as follows (S40). In this process, the surface of the glass setting plate 100 is grinded to primarily remove fragments generated by molding, and then a lapping process for smoothing the surface of the glass setting plate 100 is executed thereto using a grinding member such as a sandpaper. After that, the surface of the glass setting plate 100 is polished to finally make the surface smooth. These surface treatment processes may be selectively used in accordance with the state of the surface of the glass setting plate 100.

After the surface treatment process, the glass setting plate 100 is completely made, and this glass setting plate 100 has a substantially rectangular parallelepiped shape as shown in FIGS. 2 and 3. In more detail, the glass setting plate 100 made by molding the composite material is 2,550 mm in length, 2,250 mm in width, and 100 mm in height. Here, two side grooves 102 are prepared at each sidewall of the glass setting plate 100, and three support grooves 104 are prepared at a lower side of the glass setting plate 100. The side grooves 102 are coupled with the mold during the molding process or stably support the glass setting plate 100 to a stage (not shown) of the glass polishing system to allow movement of the glass setting plate 100. The support grooves 104 makes the glass setting plate 100 be stably placed and fixed to the stage.

The following table shows density, compression strength and thermal expansion coefficient of the glass setting plate according to the preferred embodiment of the present invention, in comparison to those of conventional carbon steel.

|  | Carbon steel (conventional) | Composite material of the present invention (polymer concrete) |
|---|---|---|
| Density (g/cm³) | 6.6-7.4 | 2.3-3.5 |
| Compression strength (MPa) | ≥50-120 | ≥110 |
| Thermal expansion coefficient (mm/mm ° C.) | 9.2-11.8 × 10⁻⁶ | 1.31 × 10⁻⁶ |

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A glass setting plate for a glass polishing system, wherein the glass setting plate is made of a composite material obtained by molding and curing a mixture of granite particles and thermosetting resin,
wherein the composite material has a compression strength of 110 MPa or more, and
wherein the glass setting plate further includes a reinforcing member disposed therein and the reinforcing member has a plurality of plates perpendicularly coupled with each other to form a lattice structure that is substantially arranged in parallel with a plane of the composite material.

2. The glass setting plate for a glass polishing system according to claim 1, wherein the composite material is cured at a temperature of about 70° C. or above.

3. The glass setting plate for a glass polishing system according to claim 1, wherein, after being molded, the composite material is surface-treated by means of grinding, lapping or polishing.

4. The glass setting plate for a glass polishing system according to claim 1, wherein the glass setting plate substantially has a rectangular parallelepiped shape.

5. The glass setting plate for a glass polishing system according to claim 4, wherein the glass setting plate is 2,550 mm in length, 2,250 mm in width, and 100 mm in height.

6. The glass setting plate for a glass polishing system according to claim 1, wherein the reinforcing member includes:
a plurality of first plates which are about 2,350 mm in length and about 50 mm in height, each first plate having a plurality of first slits along a length thereof; and
a plurality of second plates which are about 2,050 mm in length and about 50 mm in height, each second plate having a plurality of second slits along a length thereof,
wherein the first plates and the second plates are coupled with each other by mutual fitting of the first and second slits.

7. The glass setting plate for a glass polishing system according to claim 1, wherein the reinforcing member has a plurality of through holes formed in sidewalls of the lattice structure to increase a coupling force of the mixture.

* * * * *